Patented July 14, 1942

2,289,541

UNITED STATES PATENT OFFICE 2,289,541

INSECTICIDE

Walter P. Ericks, Cos Cob, and Nellie M. C. Payne, Stamford, Conn., assignors to American Cyanamid Company, New York, N. Y., a corporation of Maine No Drawing. Application January 18, 1941, Serial No. 375,014

6 Claims. (Cl. 167—22)

The present invention relates to insecticides and more particularly to a class of compounds which are especially effective as contact poisons for the control of insects and allied pests.

These insecticidal compounds are substituted guanidines and biguanides of the general formula:

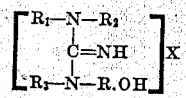

in which R is selected from the group consisting of alkyl, alkoxyalkyl and hydroxyalkyl radicals, $R_1$ is selected from the group consisting of alkyl, aryl, aralkyl, alicyclic and heterocyclic radicals, $R_2$ is selected from the group consisting of hydrogen, alkyl, aryl, aralkyl, alicyclic and heterocyclic radicals, $R_3$ is selected from the group consisting of hydrogen and a guanyl radical in which at least one hydrogen is substituted by an alkylol or an alkoxyalkylol group, and X is a salt-forming acid.

A general method of preparing the above compounds consists in reacting a primary or secondary amine with a monoalkylol cyanamide or its respective dimer in the presence of an acid, the latter being any suitable acid such as hydrochloric acid, hydrobromic acid, sulfuric acid, phosphoric acid, acetic acid, lactic acid, oxalic acid, citric acid, etc.

The monoalkylol cyanamides utilized in the preparation of these insecticidal compounds may be prepared as follows: an aqueous slurry of an alkaline earth metal cyanamide is prepared by introducing the cyanamide compound in small portions into water which is stirred rapidly. A compound containing an ethylene oxide ring such as ethylene oxide itself, 1,2-propylene oxide, isobutylene oxide, glycidol

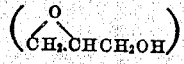

etc. is then introduced slowly at atmospheric pressure into the agitated suspension which is maintained at a temperature not exceeding the boiling point of said compound. If desired, the reaction may be carried out at elevated pressures. The mixture is filtered and the filter cake washed with water. A precipitant such as for example carbon dioxide, is introduced into the combined filtrate and washings to throw out the alkaline earth metal as a substantially insoluble compound which is filtered off. The alkylol cyanamide is obtained from the filtrate after removing the water by evaporation at low temperatures (e. g., at a temperature not higher than approximately 65° C. at atmospheric pressure).

The monoalkylol cyanamides having the formula:

$$N \equiv C.NH.R.OH$$

in which R is either an alkyl, an alkoxyalkyl, or a hydroxyalkyl radical, depending on whether one or several moles of an alkylene oxide or a hydroxy alkyl oxide, such as glycidol, are reacted with each mole of the cyanamide metal salt, when heated polymerize readily to the respective dimers of the formula:

in which R is as defined above.

The following equations illustrate more fully the formation of the products of this invention wherein a monoalkylol cyanamide is reacted with a primary or secondary amine to produce the substituted guanidine compound, and a dimer of the monoalkylol cyanamide (e. g., a dialkylol dicyandiamide) is reacted with a primary or secondary amine to produce the substituted biguanide compound, said reactions being carried out in the presence of a suitable acid, such as for example, acetic acid, and R, $R_1$ and $R_2$ are as defined in the above general formula.

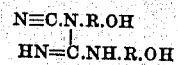

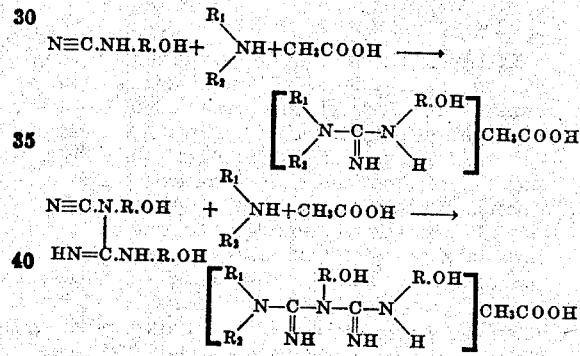

The following examples illustrate in detail the preparation of representative compounds of the invention. Materials employed are in parts by weight.

EXAMPLE 1

1-ethylol-3-dodecyl guanidine acetate 40 parts of glacial acetic acid were added with stirring to 57.4 parts of monoethylol cyanamide. To the resulting viscous, colorless liquid were added without external heating 111.4 parts of dodecylamine. The temperature of the mixture rose to 78° C. whereupon heat was applied and a temperature of 115°–120° C. maintained for 30 minutes. The product was light colored and wax-like in appearance, easily dispersible in cold water and soluble in warm water.

EXAMPLE 2

1-ethylol-3-(hexa and octa)decyl guanidine acetate

To a mixture of 191.5 parts of monoethylol cyanamide and 510 parts of mixed amines composed of 50% hexadecylamine and 50% octadecylamine heated to 106° C., there were added with stirring 167 parts of glacial acetic acid. The reaction mixture was heated slowly, and during a 30 minute period the temperature rose to 130° C. It was held at approximately 130° C. for 10 minutes. On cooling to room temperature the product was a tan colored, wax-like material.

EXAMPLE 3

1-ethylol-3-cyclohexyl guanidine hydrochloride 55 parts of concentrated hydrochloric acid were added slowly with stirring to 53.8 parts of monoethylol cyanamide. To the resulting mixture there were added 55.5 parts of cyclohexylamine. The reaction mixture was agitated and heated at 105°–110° C. for one hour, and then at 150° C. for 20 minutes. The product, on cooling, was a wax-like material, soluble in water and in organic solvents such as acetone, benzol, toluol and the like.

EXAMPLE 4

1-tripropoxypropylol-3-octadecoxypropyl guanidine hydrochloride

To a mixture of 10 parts of concentrated hydrochloric acid and 27.4 parts of tripropoxypropylol cyanamide heated to 80° C. were added slowly with stirring 32.7 parts of octadecoxypropylamine, the latter being heated to approximately 100° C. during the addition. The reaction mixture was stirred thoroughly and heated to 130° C., followed by heating at the same temperature for 20 minutes. Upon cooling, the product was a light colored, wax-like material.

EXAMPLE 5

1,3-diethylol-5-dodecyl biguanide acetate

Diethylol dicyandiamide, the dimer of monoethylol cyanamide, was formed and then condensed with dodecylamine, the dimer requiring but one-half the molecular equivalent necessary for the condensation of the amine with the unpolymerized monoethylol cyanamide. The production of the dimer and the condensation thereof with the dodecylamine were carried out as follows: 57.4 parts of monoethylol cyanamide were heated slowly with stirring to 150° C. and then held at 130°–140° C. for 15 minutes in order to form the dimer thereof, diethylol dicyandiamide. To the reaction product were added 55.7 parts of dodecylamine. The mixture was cooled to room temperature, and 50 parts of glacial acetic acid were added slowly with stirring. The reaction mixture was then heated with continuous stirring to 135° C., and held at 130°–135° C. for 30 minutes. The product was an amber colored, viscous liquid.

EXAMPLE 6

1,3-diethylol-5-dodecyl biguanide hydrochloride 57.4 parts of monoethylol cyanamide were converted to diethylol dicyandiamide according to the procedure of Example 5. To a mixture of the diethylol dicyandiamide and 55.7 parts of dodecylamine there were added with stirring 34 parts of concentrated hydrochloric acid. The reaction mixture was heated with stirring to 130° C., and then held at 130°–135° C. for 30 minutes. Upon cooling to room temperature, the product was a tan colored, wax-like material, readily soluble in water.

Spray solutions were prepared by dissolving the above insecticidal compounds in a solvent medium consisting of 65% acetone and 35% water. The following table shows the kills obtained under comparable conditions for the various dilutions when the sprays were used against the citrus red spider, *Tetranychus citri*, and the bean aphid, *Aphis rumicis*.

| Insect | Compound | Dilution | Kill |
| --- | --- | --- | --- |
| | | | Percent |
| Red spider | 1-ethylol-3-dodecyl guanidine acetate. | 1–500 | 100 |
| Do | 1-ethylol-3-(hexa and octa) decyl guanidine acetate. | 1–500 | 100 |
| Do | 1-ethylol-3-cyclohexyl guanidine hydrochloride. | 1–500 | 95.8 |
| Do | 1-tripropoxypropyl-3-octadecoxypropyl-guanidine hydrochloride. | 1–500 | 81.6 |
| Do | 1,3-diethylol-5-dodecyl biguanide acetate. | 1–500 | 100 |
| Do | 1,3-diethylol-5-dodecyl biguanide hydrochloride. | 1–500 | 100 |
| Do | ----do---- | 1–1,000 | 97.3 |
| Do | ----do---- | 1–2,000 | 85.8 |
| Aphid | 1-ethylol-3-dodecyl guanidine acetate. | 1–500 | 99.1 |
| Do | ----do---- | 1–1,000 | 74 |
| Do | 1-ethylol-3-cyclohexyl guanidine hydrochloride. | 1–500 | 92.3 |
| Do | 1,3-diethylol-5-dodecyl biguanide hydrochloride. | 1–500 | 85.7 |
| Do | 1-tripropoxypropyl-3-octadecoxypropyl-guanidine hydrochloride. | 1–500 | 73.7 |

The compounds of the present invention may also be useful either as repellents or stomach poisons for certain insects. Tests on the Mexican bean beetle, *Epilachna varivestis*, indicate that the compound, 1-ethylol-3-cyclohexyl guanidine hydrochloride, is strongly repellent, the beetles refusing to feed even when no other food is available. Compounds such as the 1,3-diethylol-5-dodecyl biguanide hydrochloride and 1-tripropoxypropylol-3-octadecoxypropyl guanidine hydrochloride gave a 65% kill on army worms, *Xylomyges eridana*, when used as a stomach poison at a dilution of 1–200 with the above water-acetone medium.

Other members of the above class of insecticidal compounds include:

1-propylol-3-octyl guanidine sulfate
1-isobutylol-3-amyl guanidine citrate
1-ethylol-3-tetradecyl guanidine phosphate
1-(2,3-dihydroxypropyl)-3-butyl guanidine oxalate
1-ethoxyethylol-3-phenyl guanidine hydrochloride
1-ethylol-3-diamyl guanidine hydrobromide
1-propylol-3-methyl phenyl guanidine acetate
1-ethylol-3-(2-pyridyl) guanidine sulfate
1-ethylol-3-benzyl guanidine hydrochloride
1,3-diethylol-5-butyl phenyl biguanide hydrochloride
1,3-dipropylol-5-octadecyl biguanide hydrobromide
1,3-diethylol-5-cyclohexyl biguanide sulfate These new insecticides may be applied in any of the conventional manners. Thus for example they may be incorporated in liquids for spraying purposes, or they may be effectively used in dusts with such inert solid diluents as kieselguhr, wood flour, walnut shell, talc and the like.

While the invention has been described with particular reference to specific embodiments it is to be understood that it is not to be limited thereto but is to be construed broadly and restricted solely by the scope of the appended claims.

We claim:

1. An insecticidal composition containing a toxic amount of a compound of the general formula:

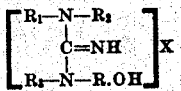

in which R is selected from the group consisting of alkyl, alkoxyalkyl and hydroxyalkyl radicals, $R_1$ is selected from the group consisting of alkyl, aryl, aralkyl, alicyclic and heterocyclic radicals, $R_2$ is selected from the group consisting of hydrogen, alkyl, aryl, aralkyl, alicyclic and heterocyclic radicals, $R_3$ is selected from the group consisting of hydrogen and the radical

wherein R is as defined above, and X is a salt-forming acid.

2. An insecticidal composition containing a toxic amount of a compound of the formula:

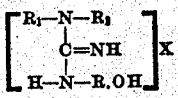

in which R is selected from the group consisting of alkyl, alkoxyalkyl and hydroxyalkyl radicals, $R_1$ is selected from the group consisting of alkyl, aryl, aralkyl, alicyclic and heterocyclic radicals, $R_2$ is selected from the group consisting of hydrogen, alkyl, aryl, aralkyl, alicyclic and heterocyclic radicals, and X is a salt-forming acid.

3. An insecticidal composition containing a toxic amount of a compound of the formula:

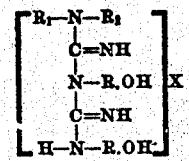

in which R is selected from the group consisting of alkyl, alkoxyalkyl and hydroxyalkyl radicals, $R_1$ is selected from the group consisting of alkyl, aryl, aralkyl, alicyclic and heterocyclic radicals, $R_2$ is selected from the group consisting of hydrogen, alkyl, aryl, aralkyl, alicyclic and heterocyclic radicals, and X is a salt-forming acid.

4. An insecticidal composition containing a toxic amount of a compound of the formula:

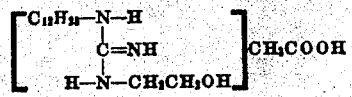

5. An insecticidal composition containing a toxic amount of a compound of the formula:

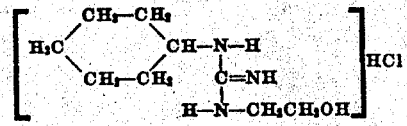

6. An insecticidal composition containing a toxic amount of a compound of the formula:

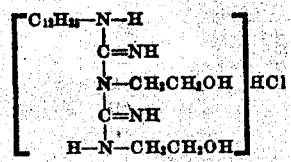

WALTER P. ERICKS.
NELLIE M. C. PAYNE.